(12) United States Patent
Rickenbach et al.

(10) Patent No.: US 8,480,124 B2
(45) Date of Patent: Jul. 9, 2013

(54) SEAT BOLSTER CHAMBER

(75) Inventors: Roger Rickenbach, Farr West, UT (US); Terry Alan Wheelwright, Morgan, UT (US); Don Parker, Layton, UT (US); Andy Holliday, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 190 days.

(21) Appl. No.: 13/008,709

(22) Filed: Jan. 18, 2011

(65) Prior Publication Data
US 2012/0181780 A1    Jul. 19, 2012

(51) Int. Cl.
    B60R 21/207    (2006.01)
(52) U.S. Cl.
    USPC ........................................... 280/730.2
(58) Field of Classification Search
    USPC .............................. 280/730.2, 729
    See application file for complete search history.

(56) References Cited

U.S. PATENT DOCUMENTS

| | | | |
|---|---|---|---|
| 3,792,873 A | 2/1974 | Buchner et al. | |
| 5,005,414 A | 4/1991 | Holland et al. | |
| 5,351,542 A | 10/1994 | Ichimura et al. | |
| 5,508,676 A | 4/1996 | Grange et al. | |
| 5,890,735 A | 4/1999 | Smith | |
| 6,015,163 A | 1/2000 | Langford et al. | |
| 6,169,479 B1 | 1/2001 | Boran et al. | |
| 6,270,113 B1 * | 8/2001 | Wipasuramonton et al. | 280/730.2 |
| 6,328,126 B2 | 12/2001 | Breed et al. | |
| 6,744,354 B2 | 6/2004 | Stephan et al. | |
| 6,827,368 B2 * | 12/2004 | Jang et al. | 280/729 |
| 6,929,282 B1 | 8/2005 | Zoratti et al. | |
| 7,098,778 B1 | 8/2006 | Zoratti et al. | |
| 7,178,826 B2 | 2/2007 | Acker et al. | |
| 7,192,050 B2 * | 3/2007 | Sato et al. | 280/729 |
| 7,278,656 B1 | 10/2007 | Kalandek | |
| 7,523,960 B2 * | 4/2009 | Song | 280/740 |
| 7,549,671 B2 * | 6/2009 | Mizuno et al. | 280/730.1 |
| 7,594,677 B2 * | 9/2009 | Sendelbach et al. | 280/743.1 |
| 7,654,562 B2 * | 2/2010 | Klima et al. | 280/730.2 |

(Continued)

FOREIGN PATENT DOCUMENTS

| | | |
|---|---|---|
| DE | 4237404 A1 | 11/1994 |
| DE | 10 2009014302 A1 | 10/2010 |

(Continued)

OTHER PUBLICATIONS

U.S. Appl. No. 11/784,594, filed Apr. 9, 2007, Mueller et al.

*Primary Examiner* — Nicole Verley
(74) *Attorney, Agent, or Firm* — Brinks Hofer Gilson & Lione (57) ABSTRACT

A side impact system for protection of an occupant of a vehicle includes a vehicle seat bolster forming a seat bolster cavity and an inflatable side airbag. The airbag includes a side panel having an outer portion defining an outer chamber. A tube panel is disposed within the side panel and joined to a seat bolster portion of the side panel. The tube panel defines a seat bolster chamber and has an opening to allow gas to flow from the seat bolster chamber to the outer chamber. The tube panel, the seat bolster portion of the side panel, and the seat bolster chamber remain within the seat bolster cavity when inflated. The seat bolster portion of the side panel contacts an inner side of the seat bolster cavity when the airbag is inflated. An inflator is operable to provide gas to the seat bolster chamber and the outer chamber.

18 Claims, 9 Drawing Sheets

U.S. PATENT DOCUMENTS

| | | |
|---|---|---|
| 7,695,002 B2 | 4/2010 | Choi |
| 7,770,921 B2 * | 8/2010 | Mueller et al. ............... 280/739 |
| 7,780,191 B2 * | 8/2010 | Sato ........................... 280/730.2 |
| 7,793,973 B2 * | 9/2010 | Sato et al. .................. 280/730.2 |
| 7,854,446 B2 | 12/2010 | Nakamura et al. |
| 7,891,704 B2 * | 2/2011 | Taguchi et al. ............... 280/739 |
| 7,900,957 B2 * | 3/2011 | Honda ........................ 280/729 |
| 7,938,440 B2 * | 5/2011 | Kataoka et al. ............. 280/730.2 |
| 7,988,191 B2 * | 8/2011 | Weyrich ...................... 280/736 |
| 8,056,923 B2 * | 11/2011 | Shimono ..................... 280/730.2 |
| 8,226,114 B2 * | 7/2012 | Shimono ..................... 280/730.2 |
| 2004/0007859 A1 | 1/2004 | Shields et al. |
| 2004/0174006 A1 | 9/2004 | Yamashita |
| 2005/0006883 A1 * | 1/2005 | Sato et al. ................. 280/730.2 |
| 2005/0062266 A1 * | 3/2005 | Steimke et al. ............ 280/730.2 |
| 2007/0228701 A1 * | 10/2007 | Yamamura ................ 280/730.2 |
| 2007/0267853 A1 * | 11/2007 | Kato et al. ................. 280/730.2 |
| 2007/0267854 A1 * | 11/2007 | Fukuda et al. ............. 280/730.2 |
| 2008/0290637 A1 * | 11/2008 | Mueller et al. ............ 280/736 |
| 2011/0074136 A1 * | 3/2011 | Honda et al. .............. 280/728.3 |
| 2012/0126518 A1 * | 5/2012 | Fukawatase ............... 280/730.2 |

FOREIGN PATENT DOCUMENTS

| | | |
|---|---|---|
| EP | 0775613 A2 | 5/1997 |
| EP | 0775613 A3 | 11/1998 |
| GB | 2180655 | 4/1987 |
| GB | 2243933 | 11/1991 |
| GB | 2248113 A | 3/1992 |
| GB | 2404634 A | 9/2005 |
| GB | 2404634 B | 7/2006 |
| JP | 6183316 | 7/1994 |
| WO | WO 0123224 | 4/2001 |

* cited by examiner

VEHICLE FORWARD / FRONT ←——————→ VEHICLE REARWARD / REAR

SEAT BOLSTER CHAMBER

BACKGROUND OF THE INVENTION

1. Field of Invention

The invention generally relates to a vehicular safety restraint system and more particularly to a vehicle safety system utilizing an airbag which can protect an occupant during a vehicle collision.

2. Background

Many inventions dealing with airbag systems have been proposed. These systems generally comprise a pyrotechnic inflator and an airbag. The airbag is installed prior to inflation in a compact folded or rolled condition. Upon sensing the occurrence of an impact collision via various sensors, such as for example, in a side impact collision with a vehicle having a side airbag system, a vehicle mounted crash sensor or accelerometer generates a control signal. The control signal causes the inflator to be activated, thereby producing or releasing inflation gas. The inflation gas inflates the airbag. Ideally, a side impact airbag is positioned between the side of the occupant and an adjacent side of the vehicle to adequately protect the occupant. The side airbag should ideally deploy quickly in order to be in position before the vehicle door closes in on an occupant in the event of a collision.

However, during operation of the vehicle, an occupant may be positioned in an out-of-normal-seating position which is sometimes referred to as out-of-position (OOP) occupant. As an example, one such out-of-position seating orientation might include a child resting within the corner formed by the outer edge of the seat and the adjacent side of the vehicle. Vehicle manufacturers typically use sensors of various types to detect when an occupant is out-of-position, which deactivate the airbag under certain criteria, but these sensors cannot address all possible occupant position situations and may be costly.

BRIEF SUMMARY OF THE INVENTION

The present invention provides a new and improved side airbag and side impact system for protection of the vehicle occupant during an impact collision. In some embodiments, the invention accounts for an out-of-position occupant during inflation of the airbag by inflating the airbag in a manner that minimizes forces acting on an out of position occupant. Therefore, in these embodiments, it may be possible to eliminate the use of sensors designed to detect an out-of-position occupant.

In at least one embodiment, the present invention provides a side impact system for protection of an occupant of a vehicle of the type including an airbag adapted to be inflated by gas from an inflator. When inflated, the side airbag is positioned beside the occupant. The side impact system includes a vehicle seat bolster forming a seat bolster cavity, an inflatable side airbag stored in a deflated condition, and an inflator. The side airbag includes at least one side panel forming an exterior of the side airbag. The side panel has an outer portion defining an outer chamber. A tube panel is disposed within the side panel and joined to a seat bolster portion of the side panel. The tube panel defines a seat bolster chamber and has at least one opening to allow gas to flow from the seat bolster chamber to the outer chamber. The tube panel, the seat bolster portion of the side panel, and the seat bolster chamber remain within the seat bolster cavity when inflated. The seat bolster portion of the side panel contacts an inner side of the seat bolster cavity when the side airbag is inflated. The inflator is operable to provide gas to the seat bolster chamber and the outer chamber.

In another variation, the side airbag includes at least one exterior panel forming an outer enclosure, an inner baffle disposed within the outer enclosure, and a loop fabric inflator diffuser. The inner baffle separates the outer enclosure to form a seat bolster chamber and an outer chamber, and the inner baffle defines at least one opening to allow gas to flow from the seat bolster chamber to the outer chamber. A loop fabric inflator diffuser is disposed within the seat bolster chamber, and the loop fabric inflator diffuser defines first and second diffuser holes in opposite sides of the loop fabric inflator diffuser.

In yet another form, the side airbag includes at least one side panel stitched together at its perimeter to form an outer enclosure having an outer seam. The side panel has an outer portion and a seat bolster portion. A tube panel is disposed within the outer enclosure and separates the outer enclosure to form an outer chamber and a seat bolster chamber. The seat bolster chamber is surrounded by the seat bolster portion of the side panel. The tube panel cooperates with the outer portion of the side panel to form the outer chamber. An inflator is in fluid communication with the seat bolster chamber and is operable to provide gas to the seat bolster chamber. The tube panel defines at least one opening to allow gas to flow from the seat bolster chamber to the outer chamber. The side panel defines a vent hole for venting gas to outside the side airbag. The vent hole is defined in the outer portion of the side panel, and the vent hole is spaced apart from the outer seam.

Additional benefits and advantages of the present invention will become apparent to those skilled in the art to which the present invention relates from the subsequent description and the appended claims, taken in conjunction with the accompanying drawings. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Further objects, features and advantages of the invention will become apparent from consideration of the following description and the appended claims when taken in connection with the accompanying drawings.

DETAILED DESCRIPTION OF THE INVENTION

Detailed embodiments of the present invention are disclosed herein. It is understood however, that the disclosed embodiments are merely exemplary of the invention and may be embodied in various and alternative forms. The figures are not necessarily to scale; some figures may be exaggerated or minimized to show the details of a particular component. Therefore, specific structural and functional details disclosed herein are not to be interpreted as limiting but merely as a representative basis of the claims and for teaching one skilled in the art to practice the present invention.

The present invention seeks to overcome some of the concerns associated with protection of a vehicle occupant via an airbag while allowing for the possibility of the occupant being out-of-position (OOP). For example, in some forms, the present invention deploys quickly even if an occupant is out-of-position, while refraining from harming the out-of-position occupant.

In some embodiments, an airbag is provided having with a high pressure chamber sized to match the size of a seat bolster in a vehicle. The high pressure chamber is contained within the seat bolster such that the speed and force of the airbag is contained within the seat bolster upon deployment. The airbag also has an outside cushion chamber, which is a low pressure chamber that interacts with the occupant outside the seat bolster. In other words, the outside cushion chamber has a lower pressure than the high pressure chamber. Both chambers are tuned to match out-of-position occupant requirements, by, for example, forming a certain number of vent holes in one or both of the chambers. The outer chamber may be larger than the high pressure chamber during inflation. The invention may allow earlier and more gentle interaction with humans than current airbag systems, creating less aggressive forces during a side impact crash.

Figure 1:
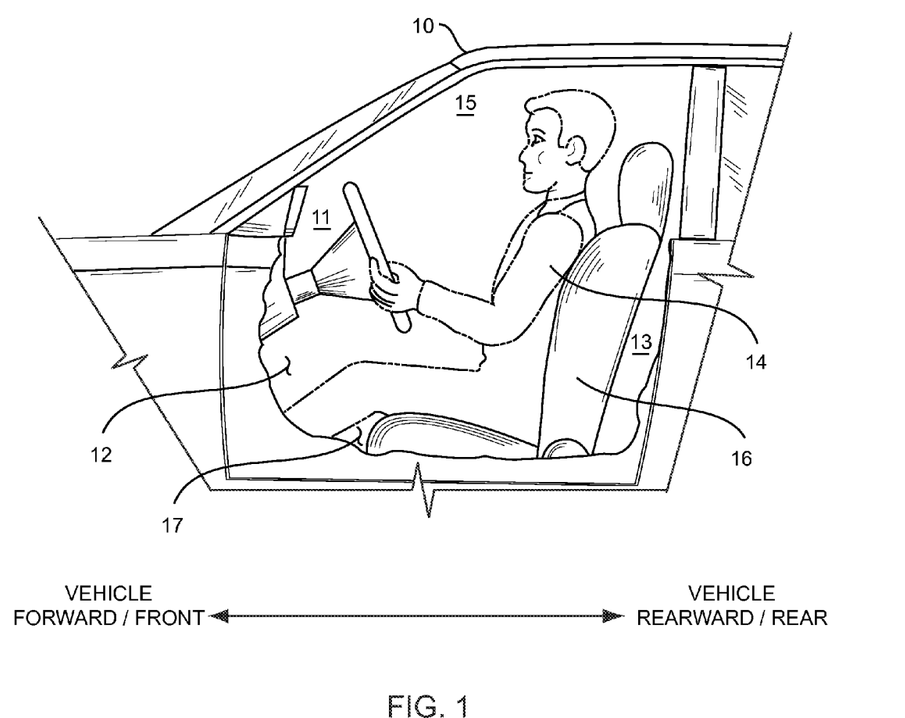
FIG. 1 is a side view of a vehicle occupant in a vehicle compartment.

Referring now to the drawings, FIG. 1 illustrates a motor vehicle 10 having an front occupant compartment 12 in which an occupant 14 is seated in a seat 16. An airbag (not shown) of flexible material may be mounted, for example, in the seat 16 and receives inflation gas from an inflator (not shown in FIG. 1). The occupant compartment 12 has generally a forward area 11 positioned towards the front of the vehicle 10, a rearward area 13 positioned towards the rear of the vehicle 10, an upward area 15 positioned towards the top of the vehicle, and a lower area 17 positioned towards the bottom of the vehicle.

Figure 2A:
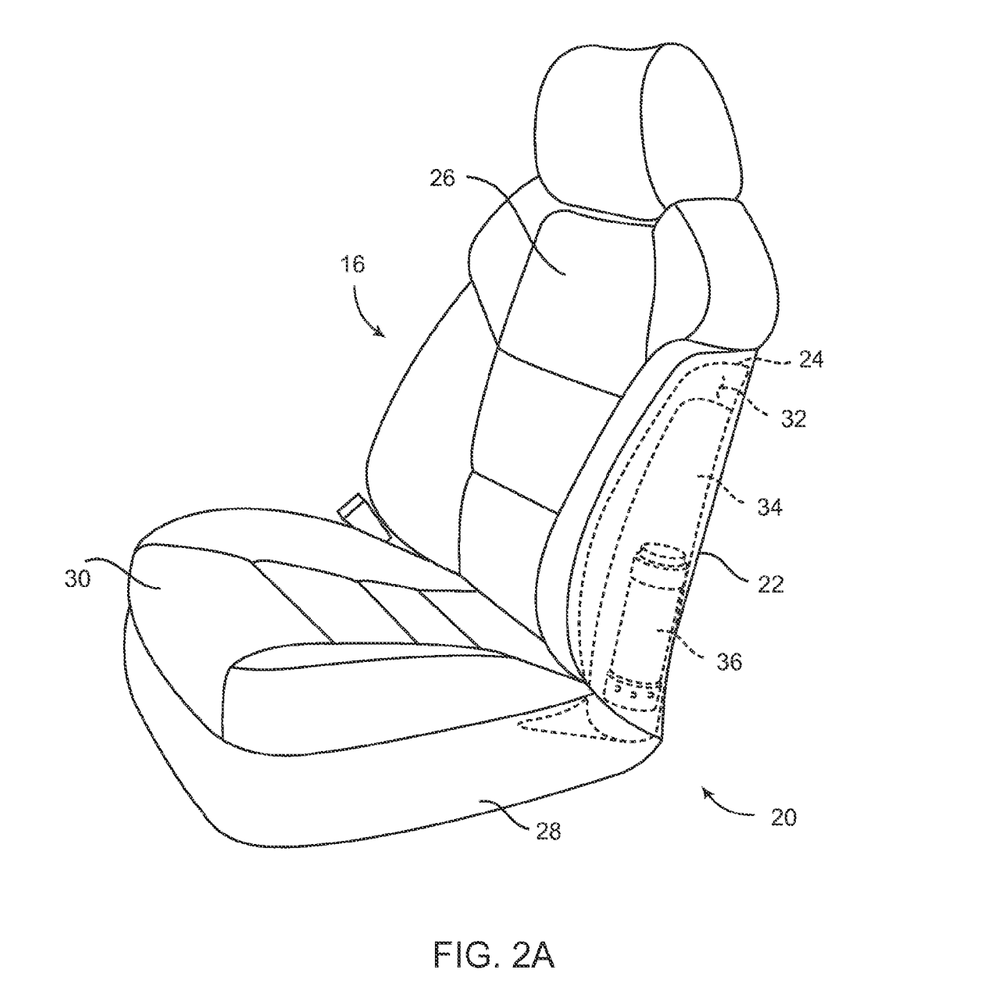
FIG. 2A is a perspective view of a side impact system including a side airbag and an inflator in accordance with an embodiment of the present invention.
Figure 2B:
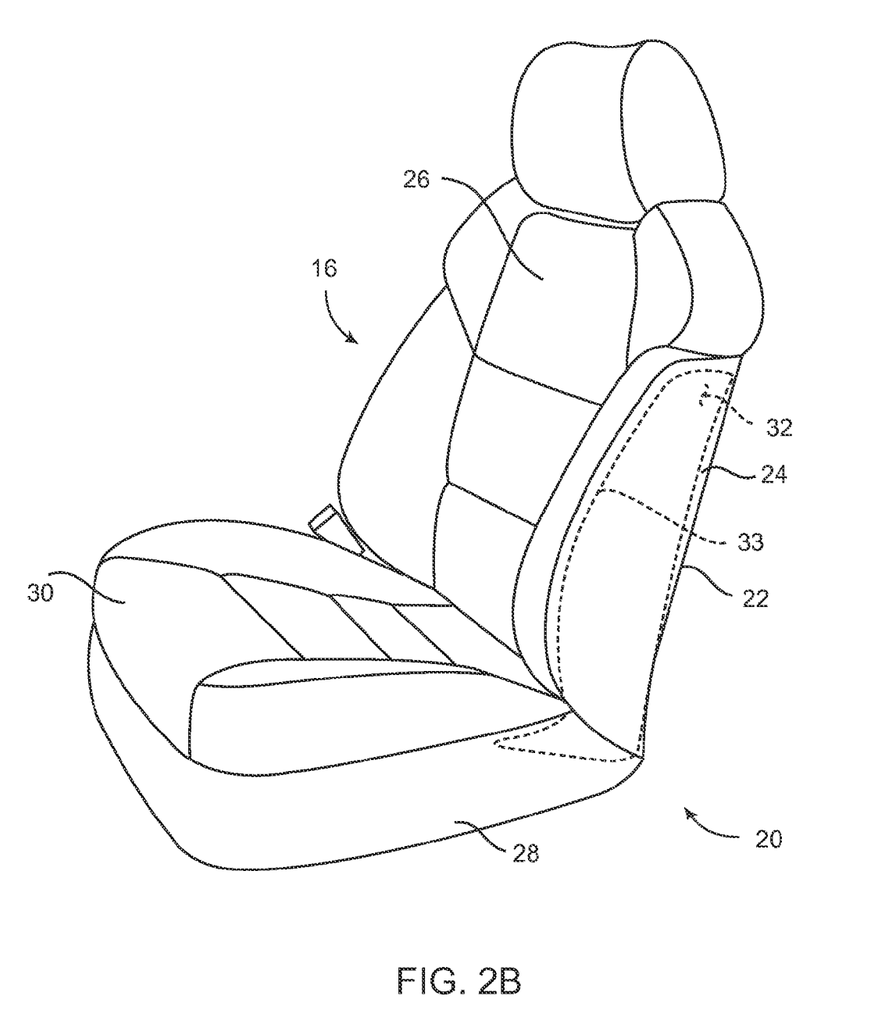
FIG. 2B is a perspective view of the side impact system of FIG. 2A, but not showing the airbag or inflator, in accordance with an embodiment of the present invention.

Referring to FIGS. 2A-2B, the vehicle seat 16 of FIG. 1 has a side impact system 20 employing the principles of the present invention is illustrated. The side impact system 20 includes a seat bolster 22, which is a part of the vehicle seat 16. The seat bolster 22 includes a side portion 24 of the seat back 26 and a side portion 28 of the seat bottom 30, by way of example. Other variations of the seat bolster 22 could include just one of the side portion 24 of the seat back 26 and the side portion 28 of the seat bottom 30, by way of example. Still other variations of the seat bolster 22 could be used, without falling beyond the spirit and scope of the present invention. For example, the seat bolster 22 could have a profile shape and size that differs from the embodiment of FIGS. 2A-2B, without falling beyond the spirit and scope of the present invention.

The vehicle seat bolster 22 has a seat bolster cavity 32 formed therein. In FIG. 2A, a side airbag 34 and an inflator 36 are shown in phantom lines within the seat bolster cavity 32, which is where the entire airbag 34 and inflator 36 may reside before the side impact system 20 is deployed. A cover of the seat bolster 22 encloses the side airbag 34 and inflator 36 within the seat bolster cavity 32, which hides them from view when the side impact system 20 is undeployed. Thus, the side impact system 20 is not visible to an occupant when undeployed, except for the seat bolster 22, which merely appears to be part of the seat 16. FIG. 2B shows the seat 16 having a seat bolster 22 with a cavity 32, without showing the contents of the cavity 32.

Figure 2C:
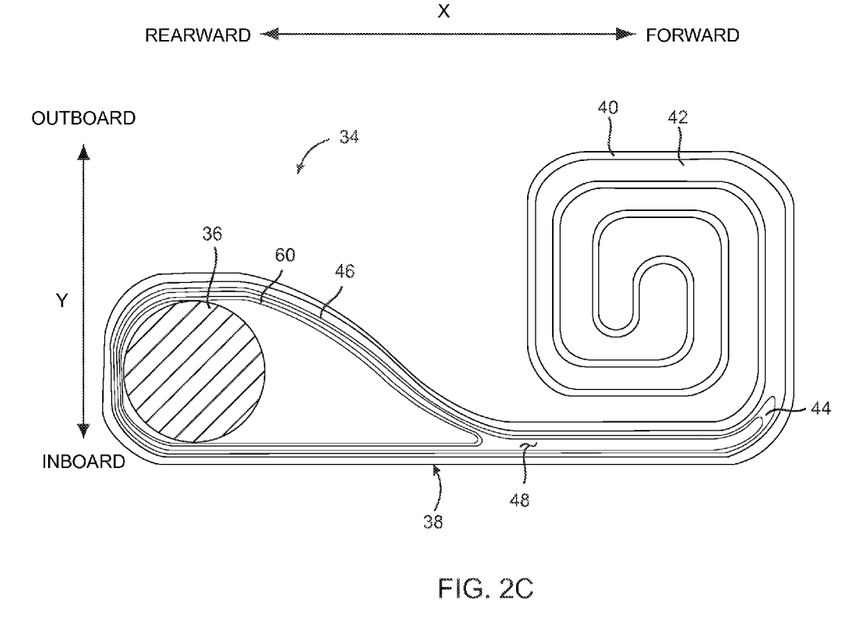
FIG. 2C is a plan view of a folding arrangement of the side airbag in a deflated condition of the side impact system of FIGS. 2A-2B, in accordance with an embodiment of the present invention.

With reference to FIG. 2C, the forward and rearward directions within the occupant compartment 12 are indicated by axis X and the inboard and outboard directions are indicated by axis Y. The airbag 34 is an inflatable side airbag, which is stored in a deflated condition in the seat bolster cavity 32. As shown in FIG. 2C, the airbag 34 may be rolled up next to the inflator 36, such as by an outboard roll fold rolled up from the forward edge 35 of the airbag 34 to rearward edge 37 which is proximate the inflator 36, by way of example, and stored in the seat bolster cavity 32. It should be understood that the side airbag 34 may be stored or folded in any suitable configuration and is not limited to the configuration shown in FIG. 2C. For example, the airbag 34 could be use a double roll fold, where both the forward and rearward edges of the airbag 34 are rolled up towards the inflator 36 such that if the forward roll is blocked by an OOP occupant, the airbag 34 will deploy more rearward as well as allowing the venting system to remain open. In another variation, a Z-pattern fold arrangement may be used, which is similar to a double roll fold arrangement, and which is preferably deployed more rearward for an OOP.

Figure 3:
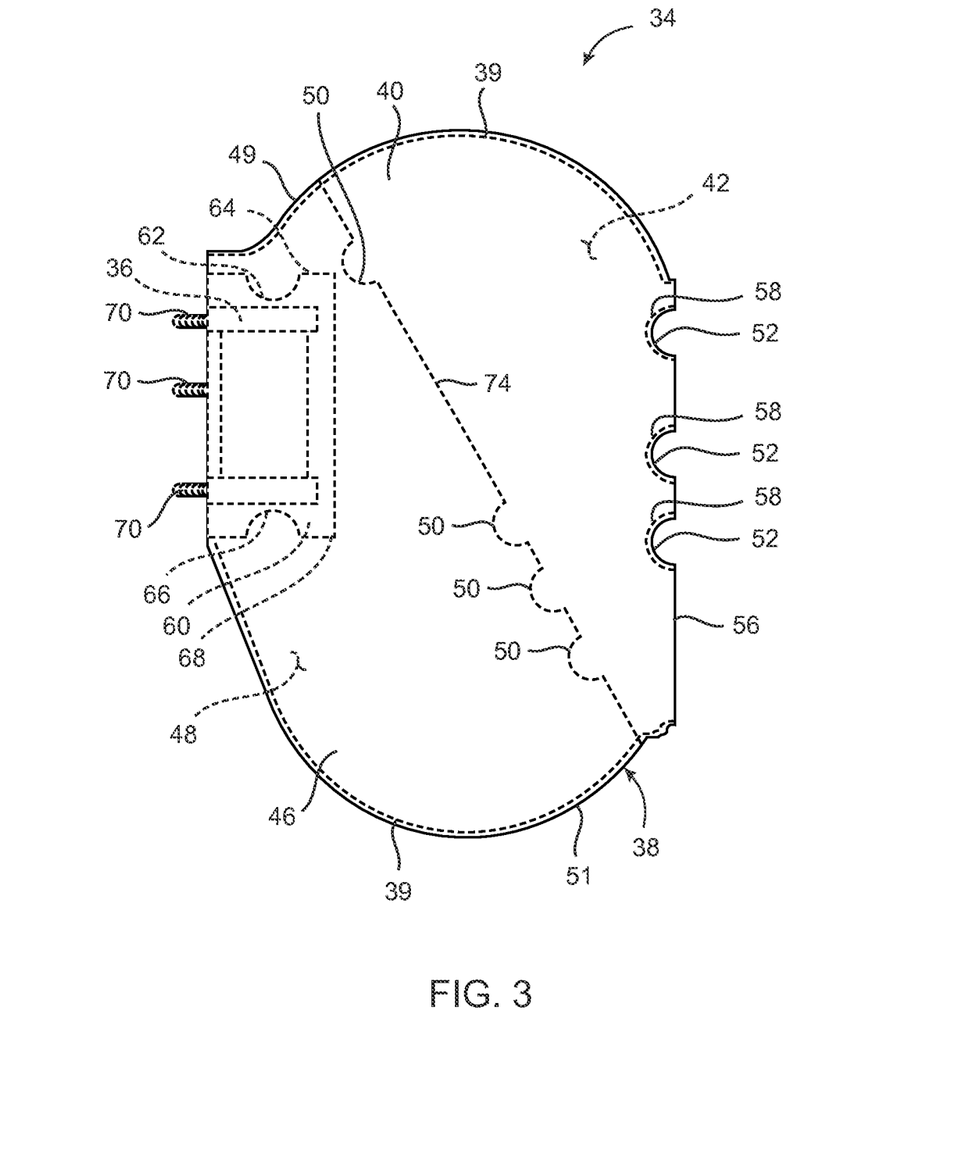
FIG. 3 is a side view of a side airbag system of the side impact system of FIGS. 2A-2C, in accordance with an embodiment of the present invention.

With reference to FIG. 3, the side airbag 34 is illustrated in further detail. The side airbag 34 has at least one exterior side panel 38 forming an exterior of the side airbag 34. The side panel 38 is stitched together at its perimeter by one or more outer seams 39 to form an outer enclosure. The side panel 38 may be a single fabric type panel or a plurality of panels joined together, for example by a sewn seam or seams. The airbag 34 may be for protection of the occupant's thorax area and/or head area and/or pelvis area and accordingly may have corresponding chambers which function to absorb impact energy specific to these areas.

The side panel 38 has an outer portion 40 defining an outer chamber 42. More particularly, in this embodiment, the outer portion 40 cooperates with an inner baffle or tube panel 44 to form the outer chamber 42. When gas flows into the outer chamber 42, it becomes inflated, which will be described in further detail below. The outer chamber 42 may also be called a forward chamber, a cushion, or a cushion portion of the airbag 34. In some forms of the present invention, the outer chamber 42 is located entirely outside of the seat bolster cavity 32 upon inflation, such that it may contact the occupant 14. Thus, when the airbag 34 is inflated, the outer portion 40 of the side panel 38 may be located outside of the seat bolster cavity 32.

Figure 4:
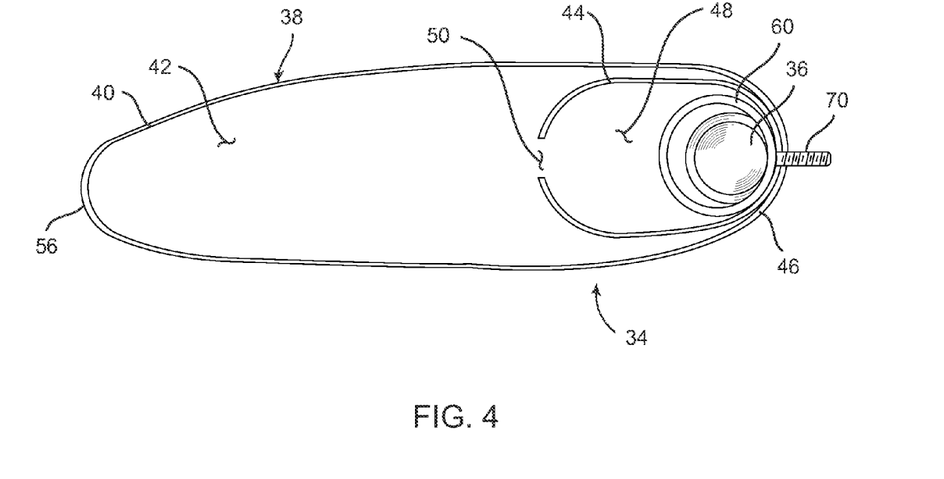
FIG. 4 is a cross sectional view of the side airbag system of the side impact system of FIGS. 2A-2C and 3, in accordance with an embodiment of the present invention.

With reference to FIGS. 3 and 4, the inner baffle or tube panel 44 is disposed within the outer enclosure formed by the side panel 38 and is joined to a seat bolster portion 46 of the side panel 38. The tube panel 44 defines a seat bolster chamber 48 and one or more openings 50 to allow gas to flow from the seat bolster chamber 48 to the outer chamber 42. In other words, the inner baffle or tube panel 44 separates the outer enclosure to form a seat bolster chamber 48 and an outer chamber 42, the inner baffle or tube panel 44 defining at least one opening 50 to allow gas to flow from the seat bolster chamber 48 to the outer chamber 42. The seat bolster portion 46 of the side panel 38 surrounds the seat bolster chamber 48. In this example, the seat bolster chamber 48 is a rear chamber that generally extends substantially from the top 49 to the bottom 51 of the airbag 34. The openings 50 may differ in size, and they may be located adjacent the top 49 of the airbag 34, and/or adjacent to the bottom 51 of the airbag 34.

The side panel 38 defines one or more vent holes 52 for venting gas to outside the side airbag 34. In some embodiments, it may be preferable to position the vent holes 52 along a periphery of the airbag 34 such that when the airbag 34 is inflating the vent holes 52 vent the gas in a direction away from the occupant 14.

Vent holes 52 may be formed in the outer portion 40 of the side panel 38. The vent holes 52 are provided to allow gas to escape from the seat bolster chamber 48 and the outer chamber 42, which may lessen the speed and force of the impact of the side airbag 34 on an occupant 14. The plurality of vent holes 52 may be sized such that when the side airbag 34 is inflated, the pressure in the outer chamber 42 is lower than the pressure in the seat bolster chamber 48.

In some forms of the invention, the vent holes 52 in the outer portion 40 are formed through the outer portion 40 of the side panel 38 at a location that is spaced apart from the outer seams 39. In this embodiment, the side panel 38 is folded over at an edge 56 and stitched along its perimeter to form the outer seams 39, and vent holes 52 are formed in the edge 56, at locations that are spaced apart from the outer seams 39. Vent hole stitching 58 may be added around the vent holes 52. Since the vent holes 52 in the outer panel 40 are spaced apart from the outer seams 39, less wear occurs on the outer seams 39 than would be the case if the vent holes 52 were formed directly adjacent to the outer seams 39 such that the inflation gas contacted the outer seams 39 while flowing through the vent holes 52. Thus, in some forms of the invention, it may be preferable to locate the vent holes 52 away from, or spaced apart from, the outer seams 39 to allow inflation gas to flow through the vent holes 52 of the outer portion 40 without contacting the outer seams 39 as it flows through the vent holes 52.

In this embodiment, the side impact system 20 also includes a diffuser 60 disposed within the seat bolster chamber 48. The diffuser 60 is a loop fabric inflator diffuser that surrounds the inflator 36. The diffuser 60 defines a first diffuser hole 62 located in a top side 64 of the diffuser 60 and a second diffuser hole 66 located in a bottom side 68 of the diffuser 60, by way of example. The first and second diffuser holes 62, 66 may be located in opposite sides of the diffuser 60 such that upon activation of the inflator 36, gas flows from the diffuser 60 in upward and downward directions.

Figure 5:
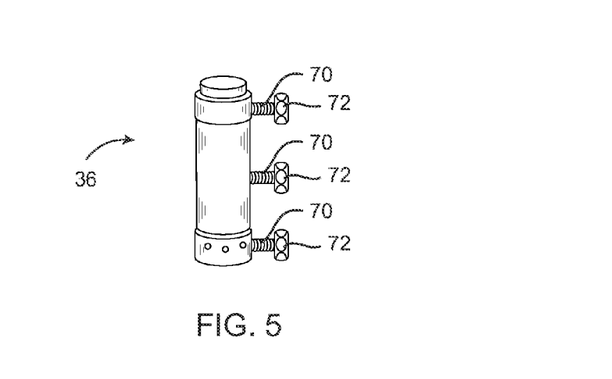
FIG. 5 is a perspective view of the inflator of the side impact system of FIGS. 2A-2C, 3, and 4, in accordance with an embodiment of the present invention.

With reference to FIG. 5, a suitable inflator 36 is illustrated. The inflator 36 is operable to provide gas to the seat bolster chamber 48 and the outer chamber 42 to inflate the side airbag 34. The inflator 36 is located within the diffuser 60, which is located within the seat bolster chamber 42 of the side airbag 34. Thus, the diffuser 60 surrounds the inflator 36; the diffuser 60 and inflator 36 are further surrounded by the tube panel 44; and the diffuser 60, the inflator 36, and the tube panel 44 are further surrounded by the seat bolster portion 46 of the side panel 38. In the alternative, the inflator 36 may be positioned outside of, or partially outside of, the diffuser 60 and the seat bolster chamber 48, so long as the inflator is in fluid communication with at least the seat bolster chamber 48. In some embodiments, the diffuser 60 could be omitted.

Upon activation of the inflator 36, gas flows from the inflator 36 through the first and second diffuser holes 62, 66 of the diffuser 60 into the seat bolster chamber 42 and subsequently through the opening(s) 50 of the inner baffle or tube panel 44 into the outer chamber 42. Thus, the inflator 36 is in fluid communication with the seat bolster chamber 48 and is operable to provide gas to the seat bolster chamber 48. The seat bolster chamber 48 is in fluid communication with the outer chamber 42.

The inflator 36 may be positioned within a portion of the tube panel 44, such as for example, a rear central portion, and the studs 70 of the inflator 36 may be inserted through corresponding holes defined in the airbag 34 such that a receiving inlet into the rear central portion becomes closed.

The mounting studs 70 of the inflator 36 may be secured to a frame of the seat 16 by fasteners 72. Prior to activation of the inflator 36, the airbag 34 is folded or rolled into a compact configuration about the inflator 36 within the seat bolster cavity 32 and covered typically by foam and an exterior covering trim material of the seat bolster 22. The inflator 36 may be secured directly to the mounting frame of the vehicle seat 16 or installed within a housing, by way of example. In one form, the airbag 34 may be situated behind an outboard seam of the seat bolster 22 such that upon inflation of the airbag 34, the inflating airbag 34 bursts through the seam. As the side airbag 34 continues to inflate, the outer portion 40 of the side airbag 34 is positioned between the side of the occupant 14 and the immediately adjacent side of the vehicle 10.

Figure 6A:
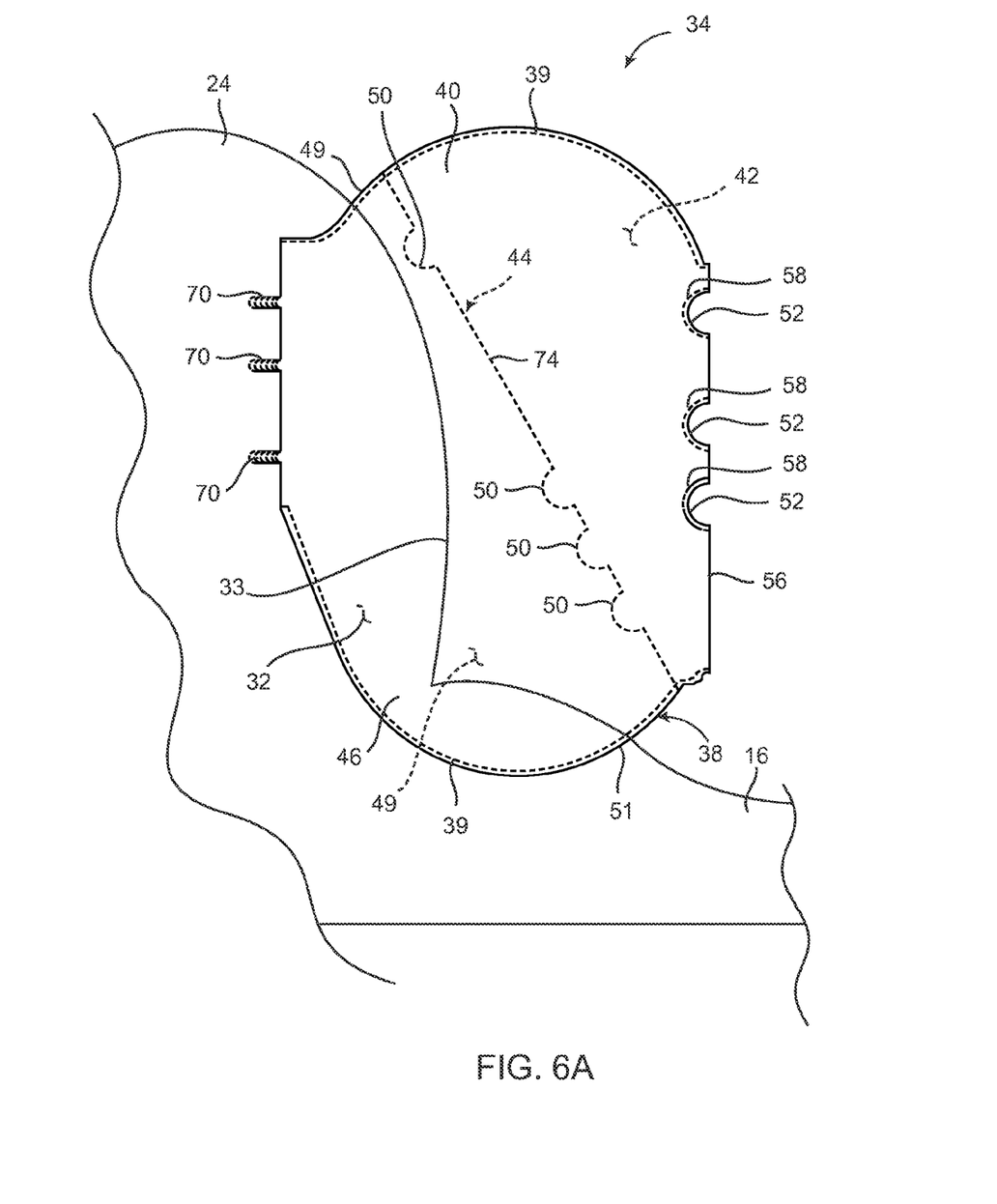
FIG. 6A is a side view of the side impact system of FIGS. 2A-2C and 3-5, the airbag shown in a deflated state, in accordance with an embodiment of the present invention.
Figure 6B:
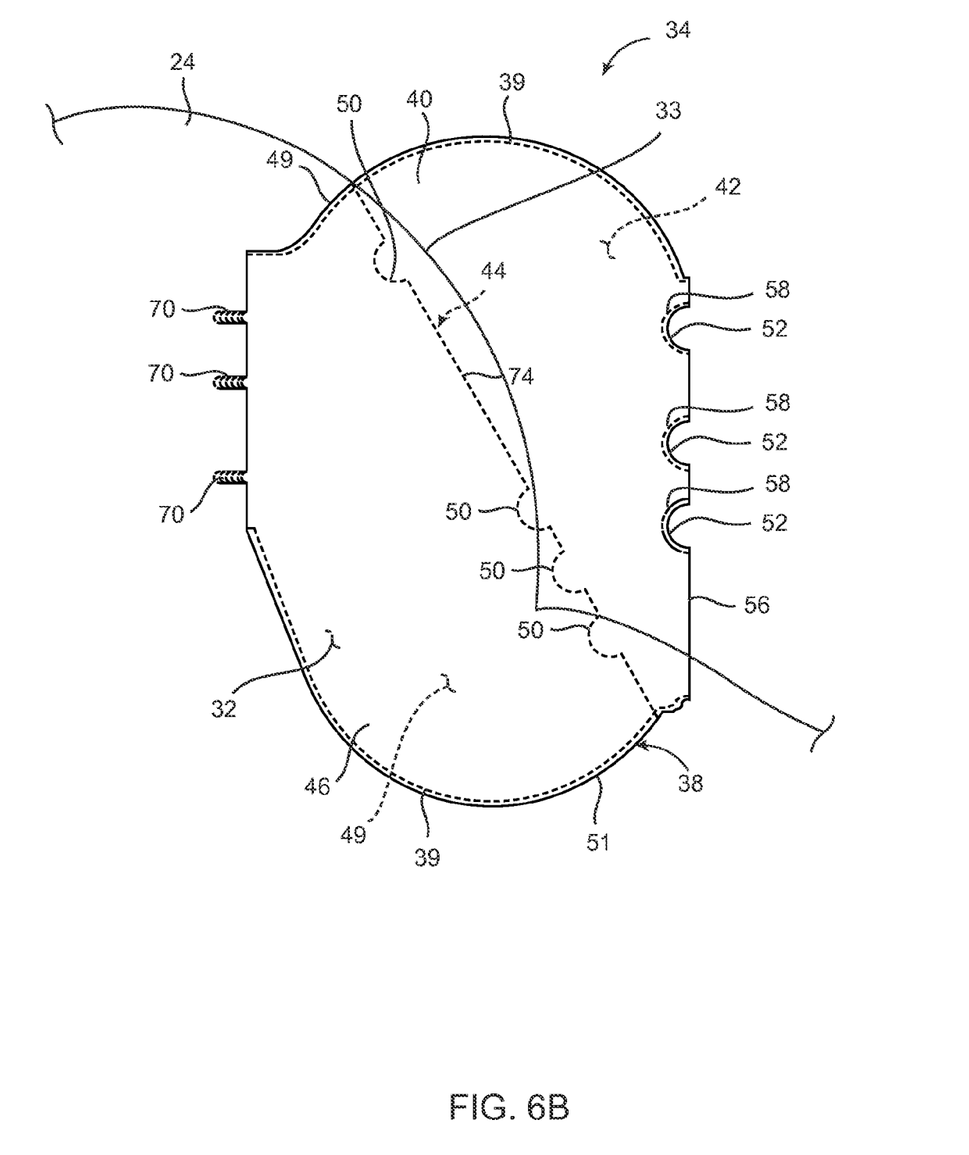
FIG. 6B is a side view of the side impact system of FIGS. 2A-2C, 3-5, and 6A, the airbag shown in an inflated state, in accordance with an embodiment of the present invention.
Figure 6C:
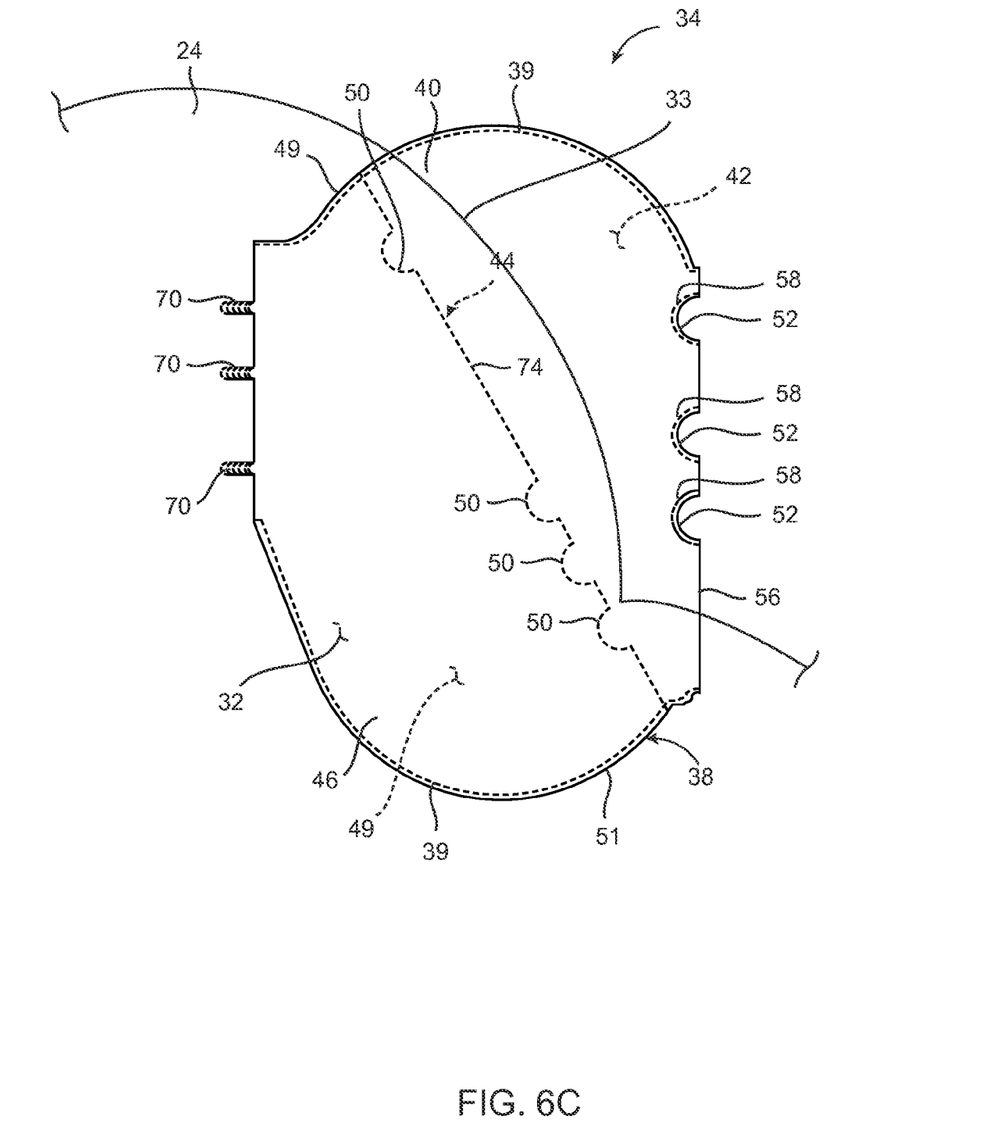
FIG. 6C is a side view of another embodiment of the side impact system of FIGS. 2A-2C, 3-5, and 6A, the airbag shown in an inflated state, in accordance with an embodiment of the present invention.

With reference to FIGS. 2A, 2B, 6A, and 6C, the tube panel 44, the seat bolster portion 46 of the side panel 38, and the seat bolster chamber 48 remain within the seat bolster cavity 32 when the side airbag 34 is inflated. In FIG. 6A, the edge 74 of the tube panel 44 is shown as extending past the cavity edge 33 of the seat bolster cavity 32, but this illustration shows the relationship between the edges 74, 33 when the airbag 34 is flat or deflated and not rolled up. When the airbag 34 is inflated, the tube panel 44, seat bolster portion 46, and the seat bolster cavity 32 remain within the seat bolster cavity 32 due to the three-dimensional shape of the tube panel 44, in some embodiments (See FIG. 6C). In the alternative, the airbag 34, the tube panel 44, the seat bolster portion 46, and the seat bolster cavity 32 may remain substantially within the seat bolster cavity 32 in the inflated state, as shown in FIG. 6B, with only minimal portions extending beyond the seat bolster cavity edge 33. It should be understood that FIGS. 6A-6C are only examples of the relationship between the seat bolster 24 and the airbag 34, and the seat bolster 24 could have other profiles that are not illustrated.

The edge 74 of the tube panel 44 is substantially adjacent to the edge 33 of the seat bolster cavity 32. In some embodiments, like the inflated embodiment of FIG. 6C in combination with the deflated embodiment of Fig. A, upon initial deployment of the airbag 34, the edge 74 of the tube panel 44 may extend past the seat bolster cavity edge 33, however, when inflated, the edge 74 will be pulled back into the seat bolster cavity 32. The edge 74 defines the width of the tube panel 44. Thus, in a deflated state, the tube panel 44 may extend to a width that is larger than the width of the seat bolster cavity 32. However, when the seat bolster chamber 48 is inflated with gas from the inflator 36, the seat bolster chamber 48 shrinks to the size of the seat bolster cavity 32, such that the tube panel 44 remains within the seat bolster cavity 32. Or, with respect to FIG. 6B, the tube panel 44 may extend slightly beyond the seat bolster cavity 32, but remain substantially within the seat bolster cavity 32.

This allows the speed and force of the inflator 36 to be contained with the seat bolster cavity 32 of the seat bolster 22, and prevents injury to an OOP occupant. In other words, the seat bolster chamber 48, the seat bolster portion 46 of the side panel 38, and the tube panel 44 remain within the seat bolster cavity 32 behind the cavity edge 33 when the airbag 34 is inflated. In some embodiments, the seat bolster chamber 48 is substantially the same size as the seat bolster cavity 32 when inflated within the seat bolster cavity 32.

The seat bolster portion 46 of the side panel 38 contacts an inner side of the seat bolster cavity 32 when the side airbag 34 is inflated. In some forms of the invention, the tube panel 44 and the seat bolster portion 46 of the side panel 38 remain within the seat bolster cavity 32 when the side airbag 34 is inflated, while the outer portion 40 forming the outer chamber 42 is located outside the seat bolster cavity 32 beside the occupant.

Therefore, a higher amount of pressure from the inflator 36 is contained in the seat bolster cavity 32 and the seat bolster chamber 48 than in the outer chamber 42. The outer chamber 42 has a lower pressure than the seat bolster chamber 48; correspondingly, the outer portion 40 has a lower pressure contained therein than the pressure in the seat bolster portion 46, the tube panel 44, and the seat bolster cavity 32. Therefore, only the lower pressure outer chamber 42 of the outer panel 40 is substantially in contact with an OOP occupant, reducing the chance of OOP occupant injury due to airbag deployment, while the higher pressure within the seat bolster chamber 48 facilitates proper positioning and break out during the initial stage of deployment.

In addition, because a higher pressure is contained within the seat bolster chamber 48 and the seat bolster cavity 32 of the seat bolster 22, the pelvis area of an occupant 14 is better protected in the event of a crash. The pressure in each of the seat bolster chamber 48 and the outer chamber 42 may be tuned to meet various desired pressures by varying the size and number of vent holes 52 in the outer and seat bolster portions 40, 46 of the side panel 38.

In some embodiments, the tube panel 44 may be positioned at an incline such that the seat bolster chamber 32 is larger at the bottom than at the top so as to bias the volume of the gas from the inflator 36 to a lower rearward portion of the seat bolster chamber 32.

In some embodiments, the outer portion 40 of the side panel 38 may be larger than the seat bolster portion 46, such that the outer chamber 42 and cushion created by the outer portion 40 is larger than the seat bolster chamber 48 and cushion created by the seat bolster portion 46 and tube panel 44 inside the seat bolster cavity 32, which may allow earlier and more gentle interaction with an occupant 14 during a crash.

As a person skilled in the art will readily appreciate, the above description is meant as an illustration of implementation of the principles of this invention. This description is not intended to limit the scope or application of this invention in that the invention is susceptible to modification, variation and change, without departing from the spirit of the invention, as defined in the following claims.

The invention claimed is:

1. A side impact system for protection of an occupant of a vehicle of the type including a side airbag adapted to be inflated by gas from an inflator, wherein when inflated the side airbag positions beside the occupant, the side impact system comprising:
   a vehicle seat bolster forming a seat bolster cavity;
   an inflatable side airbag stored in a deflated condition, the side airbag including:
      at least one side panel forming an exterior of the side airbag, the side panel having an outer portion defining an outer chamber; and
      a tube panel disposed within the side panel and joined to a seat bolster portion of the side panel, the tube panel defining a seat bolster chamber and having at least one opening to allow gas to flow from the seat bolster chamber to the outer chamber, wherein the tube panel, the seat bolster portion of the side panel, and the seat bolster chamber remain substantially within the seat bolster cavity when inflated and the tube panel having an outer edge substantially adjacent to an outer edge of the seat bolster cavity, the seat bolster portion of the side panel contacting an inner side of the seat bolster cavity when the side airbag is inflated;
   an inflator operable to provide gas to the seat bolster chamber and the outer chamber.

2. The side impact system according to claim 1, the inflator being located within the seat bolster chamber of the side airbag.

3. The side impact system according to claim 1, the seat bolster chamber being substantially the same size as the seat bolster cavity when the side airbag is inflated.

4. The side impact system according to claim 1, the side panel defining at least one vent hole for venting the gas to outside the side airbag.

5. The side impact system according to claim 4, the at least one vent hole being a plurality of vent holes, the outer portion of the side panel defining the plurality of vent holes.

6. The side impact system according to claim 5, wherein the plurality of vent holes are sized such that when the side airbag is inflated, the pressure in the outer chamber is lower than the pressure in the seat bolster chamber.

7. The side impact system according to claim 4, wherein the side panel is stitched together at its perimeter to form at least one outer seam.

8. The side impact system according to claim 7, wherein the vent hole is spaced apart from the outer seam.

9. The side impact system according to claim 8, wherein the vent hole is formed in the outer portion of the side panel.

10. The side impact system according to claim 1, the diffuser being a loop fabric inflator diffuser, wherein the first and second diffuser holes are located in the opposite sides of the diffuser such that upon activation of the inflator, gas flows from the diffuser in upward and downward directions.

11. The side impact system according to claim 10, wherein upon activation of the inflator, gas travels from the inflator through the first and second diffuser holes into the seat bolster chamber and subsequently through the opening of the tube panel into the outer chamber.

12. The side impact system according to claim 1, wherein the seat bolster cavity and the seat bolster chamber are substantially equal in size.

13. A side airbag for protection of an occupant of a vehicle of the type adapted to be inflated by gas from an inflator, wherein when inflated the side airbag positions beside the occupant, the side airbag comprising:
   at least one exterior panel forming an outer enclosure;
   an inner baffle disposed within the outer enclosure, the inner baffle separating the outer enclosure to form a seat bolster chamber and configured for substantially remaining in a seat bolster cavity of a vehicle seat when inflated and an outer chamber, the inner baffle defining at least one opening to allow gas to flow from the seat bolster chamber to the outer chamber; and a loop fabric inflator diffuser disposed within the seat bolster chamber and configured to remain inside the seat bolster cavity upon inflation of the seat bolster chamber, the loop fabric inflator diffuser defining first and second diffuser holes in opposite sides of the loop fabric inflator diffuser.

14. The side airbag according to claim 13, further comprising an inflator operable to provide gas to the seat bolster chamber and the outer chamber, the inflator being located within the loop fabric inflator diffuser.

15. The side airbag according to claim 14, wherein upon activation of the inflator, gas travels from the inflator through the first and second diffuser holes into the seat bolster chamber and subsequently through the opening of the inner baffle into the outer chamber.

16. The side airbag according to claim 13, the exterior panel comprising an outer portion that cooperates with the inner baffle to form the outer chamber, and the exterior panel comprising a seat bolster portion that surrounds the seat bolster chamber, the outer portion defining a vent hole for venting the gas to outside the side airbag.

17. The side airbag according to claim 16, the exterior panel being stitched together at its perimeter to form an outer seam, the vent hole being spaced apart from the outer seam.

18. A side airbag for protection of an occupant of a vehicle of the type adapted to be inflated by gas from an inflator, wherein when inflated the side airbag positions beside the occupant, the side airbag comprising:

at least one side panel stitched together at its perimeter to form an outer enclosure having an outer seam, the side panel having an outer portion and a seat bolster portion;

a tube panel disposed within the outer enclosure and separating the outer enclosure to form an outer chamber and a seat bolster chamber, the seat bolster chamber being surrounded by the seat bolster portion of the side panel and configured for substantially remaining in a seat bolster cavity of a vehicle seat when inflated, the tube panel cooperating with the outer portion of the side panel to form the outer chamber; and an inflator in fluid communication with the seat bolster chamber and operable to provide gas to the seat bolster chamber, the tube panel defining at least one opening to allow gas to flow from the seat bolster chamber to the outer chamber; and a fabric diffuser surrounding the inflator, the diffuser defining first and second diffuser holes in opposite sides of the diffuser, the diffuser being located within the seat bolster chamber and configured to remain inside the seat bolster cavity upon inflation of the seat bolster chamber, wherein the side panel defines a vent hole for venting gas to outside the side airbag, the vent hole being defined in the outer portion of the side panel, and the vent hole being spaced apart from the outer seam.

\* \* \* \* \*